July 9, 1940.   B. W. DAVID ET AL   2,206,865
TRANSPARENCY EXHIBITOR
Filed April 13, 1938   2 Sheets-Sheet 1
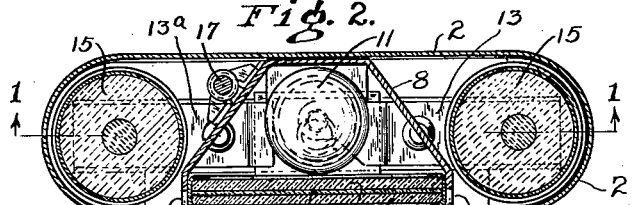
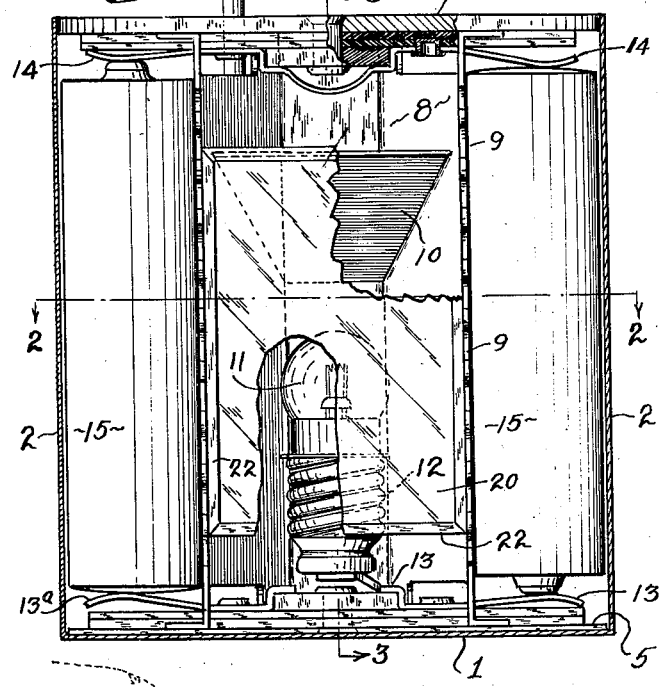
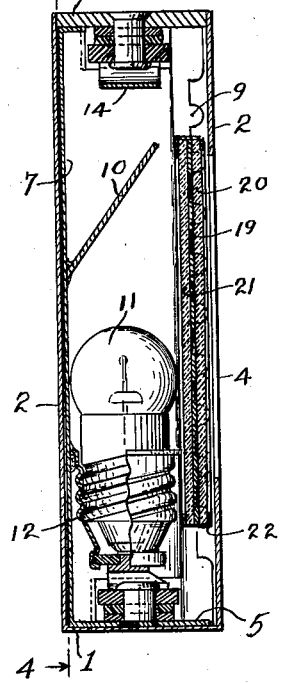
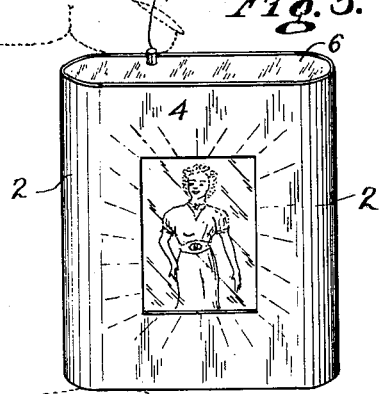
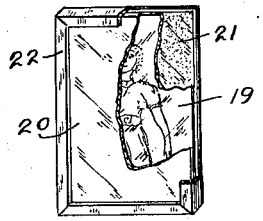
INVENTOR.
Bruce W. David.
Harry P. Dorn.
BY Milburn & Milburn
ATTORNEYS.

July 9, 1940.    B. W. DAVID ET AL    2,206,865
TRANSPARENCY EXHIBITOR
Filed April 13, 1938    2 Sheets-Sheet 2
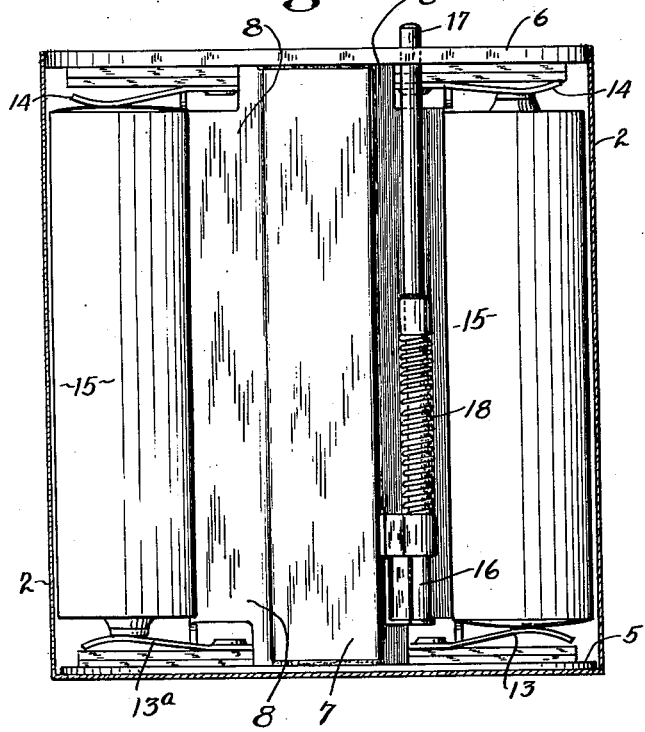
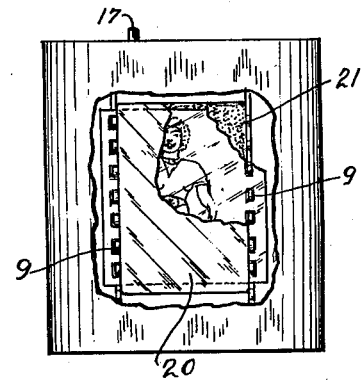
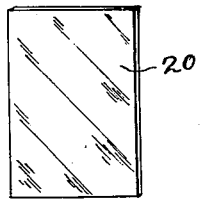
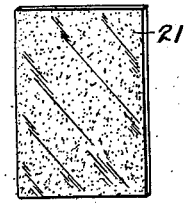
INVENTOR.
Bruce W. David.
Harry P. Dorn.
BY
Milburn & Milburn
ATTORNEYS.

Patented July 9, 1940

2,206,865

UNITED STATES PATENT OFFICE 2,206,865

TRANSPARENCY EXHIBITOR

Bruce W. David, Cleveland Heights, and Harry P. Dorn, Cleveland, Ohio

Application April 13, 1938, Serial No. 201,853

1 Claim. (Cl. 40—132)

This invention, in a general way, relates to a display device by which ornamental transparencies may be readily displayed, and it includes the various embodiments hereinafter set forth.

By way of introductory explanation, reference is here made to the growing interest in amateur photography, especially the very rapidly increasing popularity of the miniature camera using 35 mm. film. Obviously, such small negatives must now be enlarged and printed in order to bring out the minute details of landscapes, street scenes, etc.

The modern 35 mm. color film, which is proving very popular with the amateurs, especially for single exposures, can be finished as a natural color positive; but such colored pictures of landscapes, etc., must still be enlarged in order to bring out details, and the only comparatively inexpensive way of doing this at the present time is to project the same upon a screen. Obviously, this situation has retarded the use and appreciation of colored picture film by the general public, and consideration of this situation has prompted the present invention.

However, as will be readily understood, the use of 35 mm. color film for portrait and certain other classes of photography produces a wealth of detail, and the developed positive may be viewed without enlargement and by the unaided eye with a great deal of satisfaction and enjoyment, provided the positive is properly illuminated by transmitted light. The beauty of such single color positives may surpass even the once popular and expensive miniatures in oil.

Therefore, the general object of the present invention is to provide a simple and comparatively inexpensive means for displaying film pictures as well as other transparencies, this invention being especially well adapted for the class of portraits in natural color.

More specifically, this invention contemplates the provision of a device in which there may be removably placed any desired portrait film or other transparency, and in which there is provided means of illumination whenever it is desired to display the same.

This invention contemplates various forms of devices which will be hereinafter described and all of which embody the same generic inventive thought as herein set forth.

Other objects will appear from the following description and claim when considered together with the accompanying drawings.

Fig. 1 is a sectional view taken on line 1—1 of Fig. 2;

Fig. 2 is a sectional view taken on line 2—2 of Fig. 1;

Fig. 3 is a sectional view taken on line 3—3 of Fig. 1;

Fig. 4 is a sectional view taken on line 4—4 of Fig. 3;

Fig. 5 is a perspective view of the device in the form herein disclosed;

Fig. 6 is a perspective view, broken away, of one form of pack containing the transparency;

Fig. 7 is a front elevation of the present form of device and illustrates another manner of inserting the transparency;

Fig. 8 is a perspective of the transparent medium as employed in connection with the film in Fig. 7;

Fig. 9 is a perspective of the film as used in Fig. 7; and

Fig. 10 is a perspective of the light-diffusing medium as employed in Fig. 7.

It is to be understood that the present disclosure is merely for purposes of illustration and that there may be devised various modifications without departing from the spirit of the invention as herein set forth and claimed.

According to the present illustration, there is disclosed a substantially flat form of device which can be held in the one hand and placed in the pocket of a garment or in a lady's pocket-book. However, the size and shape of the device may be varied when made up in either the form of a self-contained device or as an auxiliary part of another device, as will be explained.

Referring to the accompanying drawings, the casing has the end 1 and shell 2 formed as a unitary part and may be regarded as the cover or casing for the working parts to be described.

In one wall of the shell 2 there is provided a window 4 through which there may be displayed a film picture or other ornamental transparency.

The holder for the parts within the cover, comprises the bottom metal plate 5 and the top metal plate 6 which fit snugly within the cover, the plate 6 serving as a closure for the open end of the shell 2. Extending between and attached at its ends to the plates 5 and 6, is the three-sided wall member comprising the rear wall 7 and the side angular walls 8. The edge portions of the walls extend substantially parallel to each other and normal to the flat walls of the shell 2, and have projections or teeth 9 provided therealong for a purpose to be explained.

The space between the rows of projections 9 is slightly greater than the width of the window 4, and a transparency is adapted to be held in engagement between the opposite edge portions of the walls 8 and in registry with the window 4. Likewise, the other dimension of the space between the walls 8 is greater than the length of the window 4 so that the transparency is framed by the window for exhibiting the same therethrough. The transparency will be more fully described below.

The walls 8 may be coated so as to improve their light-reflecting property and likewise the auxiliary transverse inclined wall 10 may be similarly coated, so as to provide an efficient reflecting means for directing the light rays of the incandescent light bulb 11 for illuminating the transparency in the most efficient manner. As will be seen, the space provided by the walls 7, 8 and 10 constitutes a chamber for the bulb 11 which can be mounted in any suitable manner.

In the present form of illustration, the bulb socket 12 is mounted on the wall 7 and on the inner end of the metal strip 13. Both of the metal strips 13 and 13a are insulated from plate 5 and are spaced from each other at their inner ends. At the top there is a companion continuous metal strip 14 which is insulated from the plate 6, the ends of strip 14 being directly above the outer ends of strips 13 and 13a, and these end portions being sufficiently resilient for effective engagement of the ends of the batteries 15 therebetween. As will be observed, these batteries fit compactly at the rear and to the side of the inclined walls 8.

The switch 16 is slidably mounted upon the rear side of one of the walls 8 so as to be depressed for effecting electric contact between the wall 8 and the strip 13a, thereby closing the circuit through the bulb and batteries for illuminating the transparency. The switch 16 is operated by means of the rod 17 which projects out through the plate 6 for convenient manipulation by the user, and the spring 18 normally forces the rod 17 upwardly so as to open the switch.

It is to be understood that any desired transparency may be exhibited in this device, provided it is of the proper size to fit in the space therefor. In the present instance, we have illustrated two ways of applying the transparency to this device. One form of transparency is shown in detail in Fig. 1 and Fig. 6, while the other form is shown in Fig. 7 to Fig. 10 inclusive.

In the first form of transparency, the picture film 19 has its perforated margins removed and is then placed between a clear glass 20 or like transparent medium and a milk glass 21 or other light-diffusing medium. These three elements are then secured together by the binding 22 so that there is produced what might be regarded as a self-contained pack. When this pack is placed in the holder of this device the light-diffusing medium is placed towards the bulb 11 in order to obtain uniform illumination of the picture film. The frictional engagement of the edges of the pack between the edge portions of the walls 8 will serve to hold the pack in position, especially since the corners of the pack will be supported in the corners between the walls 8 and the edge portions thereof. The marginal portions of the pack may be engaged by the inner marginal portion of the shell 2 about the window opening 4, and thus the pack may be even more securely held in place when the parts are in assemblage.

In the other manner of applying the picture film to the holder, we preserve the perforations of the picture film and merely place the desired section of the film between a light-diffusing medium and a transparent medium and then insert these three elements in position, the light-diffusing element being adjacent the bulb, and the film perforations engaging over the projections 9. The registry of the film perforations with the teeth 9 serves to properly position the transparency with respect to the window both longitudinally and transversely, and the engagement of the cover over the transparent medium is alone sufficient to hold these parts in proper assembly.

If so desired, there may be provided a means upon the edge portions of walls 8 to indicate the correct position for the transparency in order to be properly framed by the window 4, or the pack and space therefor may be made of the same size so that the pack will always assume position of proper registry with the window.

Thus, we have devised film-holding means readily removable from the holder and easily replaced by any other desired picture. This is true of both forms of transparency as above described. By following the form indicated in Figs. 7 to 10, even the amateur photographer can insert the desired section of picture film into the device. If the first form of pack, as shown in Fig. 6, can not be made by the amateur, it would be very inexpensive to have it made by the professional who develops the film. In fact, with the advent of the present device upon the market, there is reason to believe that preparation of these packs would soon become a special line of service to be offered at the photographic store.

The present form of device, as here illustrated, is of substantially flat form that can be conveniently held in the one hand or between the thumb and finger of the hand, and the switch button 17 can be depressed by a finger of the same hand, if so desired, as indicated in Fig. 5 of the drawings. However handled, this device is of such form and size, in its various embodiments and adaptations, that it can be carried about in the pocket of a garment or in a lady's pocket book, in the same manner as a cigarette case, a cigarette lighter, a compact, etc. As will be readily understood, by merely depressing the button 17, the picture upon the film will be illuminated so as to be displayed through the window 4. In this way, there is provided a comparatively inexpensive way of displaying a choice film picture; and, especially in the case of color photographs, this proves a source of great delight. The recollection of a friend can be refreshed immediately at any time and anywhere by means of a color film at an insignificant cost.

Instead of the unitary, self-contained form of device, as herein illustrated, it is possible also to embody this same invention in the casing of any one of various other devices, as for instance in a compact, a cigarette case, etc. In any such embodiment, our device can be so incorporated that the transparency will be displayed through one of the main walls of the case so as to be visible without opening the cover of the compact or the like, or it can be so arranged that it is necessary to open the cover of the compact, for instance, in order to view the transparency. In the latter arrangement, there may be provided a means whereby the light switch will be automatically closed and opened by the opening and closing of the cover of the compact or the like, respectively.

Another specific possible adaptation of our invention is in an electric flash light, in which case the window for viewing the transparency would be provided in the side of the flash light casing, and the other parts would be arranged accordingly.

In some instances, as for instance in that type herein illustrated, we may provide a double or other multiple form of device with different transparencies capable of being viewed through windows in the opposite walls of the shell or casing. In the case of a double form, the windows may be arranged exactly opposite each other and the same light bulb can be employed for illuminating both transparencies. This is accomplished by placing the bulb between the two packs, the light-diffusing medium on one side of the bulb serving to reflect some of the light rays back through the other transparency. In this way, the provision of the reflector which is otherwise required, is eliminated. While viewing one of the transparencies, the hand of the user may be placed over the window at the opposite side so as to still further improve the illumination of the transparency being viewed.

If so desired, the pack may be made to include a suitable form of mat for framing the picture and for cutting out those parts which it is desired not to display.

In the self-contained form of device herein illustrated, there may or may not be provided a cover to be readily opened for viewing the transparency, and the closing of the light switch may or may not be automatic with the opening and closing of such a cover.

Our invention may be embodied also in a bracket or ornamental support that can be placed upon a table, desk, dresser or wherever desired as a decorative feature of a room. In such case, the device may be constructed along the same general lines as herein illustrated and provided with a suitable form of bracket. Instead of the battery, there may be provided a means of detachable connection between the light circuit in the device and the house lighting circuit with a step-down transformer. In such an arrangement, any form of switch-control means may be employed, as for instance the familiar snap switch which will permit the transparency to be illuminated for an indefinite period without requiring attention.

When this bracket form of device is illuminated by means of batteries, they may be arranged in different manners, as for instance at the rear, at the side or sides, or at the bottom of the device, and the reflecting means arranged accordingly.

Another possible arrangement in the bracket form of device is to place at the rear of the transparency a vertically disposed plate glass which is frosted or otherwise rendered light-diffusing on its side adjacent the transparency, and into the lower edge of which the light is introduced so as to be internally reflected within the plate glass and thereby directed through the light-diffusing medium for illumination of the transparency. In this arrangement, the battery or batteries, lamp and reflector would be placed in the bracket base within which the plate glass is supported.

It is also possible to provide an endless film carrying a succession of pictures, together with suitable means for moving the film when it is desired to change the picture for display at the window. In such an arrangement, the transparent and light-diffusing elements might be made to occupy a fixed position while moving the film for changing the picture; or the picture might be changed upon removal of the other elements and then replacing the same.

In any of the embodiments herein disclosed, there may be provided a plurality of windows for exhibiting a corresponding number of transparencies either simultaneously or independently of each other, especially in the bracket form of device.

The size, relative proportions and relative arrangement of the several parts involved in our several forms of device may be varied according to desire and conditions, as will be readily understood.

Thus we have devised a practical way of displaying a transparency in a novel and attractive manner; and such means is calculated to inject new life and interest into the art of photography, especially color photography. Furthermore, our device makes it possible to convert the color films into a constant source of enjoyment which has heretofore been impossible, and this at comparatively little expense.

What we claim is:

A substantially flat pocket device, comprising a cover with a window therein and a unitary holder to which the cover is removably applied, a readily removable pack mounted in said holder and comprising a forward transparent medium, a rearward light-diffusing medium and an ornamental transparency arranged between said media and in registry with said window, an electric light bulb mounted in said holder for illumination of said transparency through said light-diffusing medium, light-reflecting means provided upon said holder for directing rays of light through said light-diffusing medium, battery means carried by said holder and having electric connection with said bulb, an electric switch in said light circuit for controlling the illumination of said transparency for viewing the same through said window, and a switch actuating button so located upon the outside of said device as to be readily accessible to the finger or thumb of the hand which holds the device.

BRUCE W. DAVID.
HARRY P. DORN.